Patented July 20, 1948

2,445,739

UNITED STATES PATENT OFFICE 2,445,739

STABILIZATION OF DICHLOROBUTADIENE RESINS

George P. Rowland, Jr., Pottstown, Pa., and Robert J. Reid, Canal Fulton, Ohio, assignors to The Firestone Tire & Rubber Company, Akron, Ohio, a corporation of Ohio No Drawing. Application August 16, 1947, Serial No. 769,076

14 Claims. (Cl. 28—82)

This invention relates to the stabilization, against deterioration by light and oxidation, of resinous polymers and copolymers of 2,3-dichlorobutadiene-1,3, hereinafter referred to, for brevity as "dichlorobutadiene." In general, the invention is based upon the discovery that the resistance to light and oxidation of such polymers and copolymers may be greatly enhanced by the addition thereto of mercaptols and mercaptals.

THE DICHLOROBUTADIENE RESIN

Referring first to the dichlorobutadiene polymers which may be stabilized in accordance with this invention, this material has been polymerized heretofore to yield products aptly described as hard, infusible and insoluble. While such refractory resins may be stabilized in accordance with this invention, it has recently been discovered that, providing certain precautions are observed, dichlorobutadiene may be polymerized to yield resins which are fusible to fluid melts, are soluble in hot solvents, and have crystalline properties similar to those of the nylon and vinylidene chloride resins—i. e., they may be extruded, and cold stretched to yield filaments, cordage, etc. having excellent strength and flexibility and exhibiting oriented-crystalline X-ray patterns. These latter resins are clearly of great technical merit, and accordingly, the invention is more particularly directed to the stabilization of such crystalline resins. However, it is to be understood that any of the polymers and copolymers of dichlorobutadiene containing a sufficient amount of dichlorobutadiene (say from about 25% to 100%, based on the total weight of resin) so that the failure thereof under exposure to light and oxidation occurs via mechanisms dependent on the polydichlorobutadiene structure, may be stabilized in accordance with this invention.

More particularly with respect to the crystalline dichlorobutadiene resins above alluded to, it is thought, without absolute commitment to this theory, that the casually produced polymers of dichlorobutadiene described in the prior art were intensively cross-linked, degraded, etc., and were therefore incapable of asserting any tendency which the dichlorobutadiene polymer chain may have toward crystalline behavior. At any rate, it has recently been found that, providing certain precautions are observed in the production of dichlorobutadiene polymers and copolymers, there are obtained crystalline resins comparable to nylon and vinylidene chloride resins. These precautions are:

1. A restrained chlorination of a refractory dichlorobutadiene polymer of the prior art, the chlorine uptake being strictly confined to the range 2–10%, and preferably 3–5%, based on the weight of polymer. This degree of chlorination does not appear to alter the essential polymeric chain, but merely breaks up cross-links, side structures, hyper-polymerized nuclei, etc.

2. The use of "modifying agents," as the term is understood in the synthetic rubber art, to include certain polymerization-controlling and-directing substances such as lauryl mercaptan, butyl mercaptan, thiophenols, hexamethylene dimercaptan, diisopropyl xanthogen disulfide, etc. The inclusion, in the polymerization mixture, of from 0.5% to about 3% of these materials, based on the weight of monomers (including comonomers as detailed below) will develop highly crystalline properties in the resultant resins. The technique is applicable to solution, emulsion, or mass polymerization.

3. Polymerization in non-reacting organic solvents, e. g., toluene, benzene, methanol, ethanol, ether, hexane, etc., in concentrations of from about 10% to about 60%, based on the total weight of solvent and of dichlorobutadiene, at relatively elevated temperatures on the order of from about 40° C. to about 100° C., and in the presence of from about 0.1% to about 5.0%, based on the total weight of polymerization mass, of a peroxidic catalyst such as benzoyl peroxide.

Of all these techniques, that outlined under (2) is the most practical for the manufacture of resins for extrusion and orientation into filaments, to the stabilization of which the present invention is of especial application.

As noted above, the present invention may be applied to the stabilization both of homopolymers of dichlorobutadiene and of copolymers thereof with unsaturated compounds copolymerizable therewith. Dichlorobutadiene is readily copolymerizable with a wide variety of unsaturated compounds which are themselves addition-polymerizable; and the stability of the resultant resins is materially enhanced by the addition of mercaptols in accordance with this invention, provided that the dichlorobutadiene is present to an extent (say 25% to 100%, based on the weight of resin) such that the mechanism of degradation thereof contributes substantially to the ultimate failure of the resin. It is understood that, if the resin is to be of the fusible, crystalline type, it must not contain more than about 2% of a cross-linking comonomer (i. e., a plurally unsaturated comonomer in which the ethylenic groups are not conjugated or cross-conjugated) nor more than about 10–15% of any other comonomer. These last two restrictions do not apply, if fusible crystalline resins are not desired. Suitable non-cross-linking comonomers are exemplified in vinyl compounds on the order of vinyl ethyl ether, vinyl β-chloroethyl ether, vinyl higher fatty ethers, vinyl phenyl ether, etc.; vinyl ketones such as vinyl methyl ketone, methyl isopropenyl ketone, vinyl phenyl ketone, etc.; cyclic vinyl compounds such as styrene, α-methyl styrene, nuclearly chlorinated styrenes, p-vinyl benzoic acid, β-vinyl naphthalene, vinyl benzoate, vinyl carbazole, various vinyl pyridines, and the like; acrylic and substituted acrylic compounds such as methyl acrylate, methyl methacrylate, vinyl furane, ethyl chloroacrylate, methacrylonitrile, chloroacrylonitrile, acrylonitrile and the like; vinylidene halides such as vinylidene chloride, vinylidene bromide, 1-fluoro-1-chloro-ethylene; 1,1-dichloro-2,2-difluoro-ethylene; compounds bearing an active cyclic unsaturated carbon atom such as coumarone, indene, 4-methylene-1,3-dioxolane, substituted derivatives of this material, and the like. Examples of suitable conjugated and cross-conjugated copolymerizable compounds are butadiene, cyclopentadiene, chloroprene, 1-chlorobutadiene, isoprene, 2,3-dimethyl butadiene-1,3, piperylene, 2-methyl pentadiene, etc.

THE MERCAPTOLS AND MERCAPTALS

The mercaptols and mercaptals which may be employed in accordance with this invention may be any organic compounds having the formula

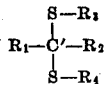

wherein

R₁ and R₂, each independently of the other, indicates a hydrogen atom or an organic radical, a carbon atom of which is directly attached to the central carbon atom C' of the formula, which organic radical may be simple aliphatic, araliphatic or aromatic hydrocarbon, or may contain non-hydrocarbon groupings and substituents not inimical to the stability of the dichlorobutadiene resin, such as ether, thioether, ester, thioester, ketone, aldehyde, sulfone, chloro, fluoro, nitro, amino, and like groups, and R₃ and R₄, each independently of the other, indicates an organic radical, a carbon atom of which is directly attached to the adjacent sulfur atom shown in the formula, which organic radical may be simple aliphatic, araliphatic or aromatic hydrocarbon, or may contain non-hydrocarbon groupings and substituents not inimical to the stability of the dichlorobutadiene resin, such as ether, thioether, ester, thioester, ketone, aldehyde, sulfone, chloro, nitro, fluoro, amino, and like groups.

These mercaptols, as implied in their names, may conveniently be produced by the condensation of an aldehyde or ketone with one or more mercaptans in accordance with the reaction

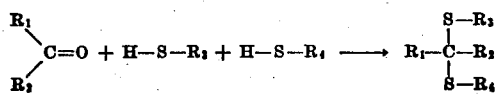

using the notation of Formula I above. The reaction may be carried out combining the aldehyde or ketone and the mercaptans, with application, if necessary, of heat on the order of 0° C.–150° C. and with addition of catalysts such as HCl, ZnCl₂, p-toluene sulfonic acid, etc. Aldehydes and ketones suitable for this reaction will be seen to include, for example, acetone, formaldehyde, acetaldehyde, mesityl oxide, acetonyl acetone, benzaldehyde, glyoxal, dibenzal acetone, chloral, cinnamaldehyde, cinnamal acetone, 2,3-dimethoxybenzaldehyde, acrolein, 2-ethyl-3-propyl acrolein, isophorone, camphor, acetyl acetone and the like. Suitable mercaptans will be seen to include, for example, cetyl mercaptan, dodecyl mercaptan, n-octyl mercaptan, butyl mercaptan, 2-ethyl hexyl mercaptan, thiophenol, thio-p-cresol, thio-β-naphthol, tetramethylene dimercaptan, mercaptobenzothiazole, α-pinene mercaptan, thioglycolic acid, the addition products of hydrogen sulfide to diisobutylene and to triisobutylene and the like. Specific suitable resultant mercaptols and mercaptals are exemplified in acetone dicetyl mercaptol; mesityl oxide-di-n-octyl mercaptol; acetonyl acetone tetracetyl mercaptol; benzal thio-p-cresol mercaptol; benzaldehyde-di-thio-β-naphthol mercaptol; chloral didodecyl mercaptol; dicinnamal acetone dicetyl mercaptol; dibenzal acetone di(thio-β-naphthol) mercaptol; 2,3-dimethoxy benzaldehyde di(thio-β-naphthol) mercaptol; benzal thio-p-cresol mercaptol; glyoxal tetraacetyl mercaptol; lauraldehyde thio-β-naphthol mercaptol; acetone dicetyl mercaptol; 2-ethyl-3-propyl acrolein cetyl mercaptol; acetone dibutyl mercaptol; acetyl acetone tetraacetyl mercaptol; acetyl acetone tetraoctyl mercaptol; acetone di-t-decyl mercaptol; acetyl acetone di-t-butyl mercaptol; didodecyl mercaptol of camphor and the like.

AMOUNT AND COMPOUNDING OF MERCAPTOLS

The addition, to a polymer or copolymer of dichlorobutadiene, of as little as 0.5%, based on the weight of resin, of a suitable mercaptol, will definitely enhance the resistance thereof to light and oxidative deterioration. Increasing quantities, up to about 2%, will give still further enhanced stability, rendering the polymers and copolymers suitable for the most rigorous conditions of service. Still greater quantities, on the order of 3% to 6%, may be used, but will ordinarily be found wasteful.

While the stabilizers of this invention may be used alone, and when so used provide excellent protection of dichlorobutadiene resins against deterioration by light, particularly excellent results are obtained when the stabilizers of this invention are employed in conjunction with a combination of (A) a light screening agent and preferably, but not necessarily, (B) a mild antiacid. The resins so protected have stabilities not attainable by the use of any of the individual components alone. Light-screening agents are a well-known class of materials which are compatible with resins and which bar the transmission of actinic rays, and include for instance phenyl salicylate; o-cresoxy-ethyl-o-benzoylbenzoate; p-benzoyl phenylsalicylate; bisphenol A disalicylate; t-butyl catecholyl disalicylate; triphenyl carbinol; 2-6-t-butyl-4-methyl phenyl salicylate; p-tert-butyl-phenyl salicylate; 2,2'-dihydroxy benzophenone; p-nonyl phenyl salicylate, p-ethyl phenyl salicylate, p-octyl phenyl salicylate, salicylic acid reaction products of alkylated cresylic acids, and the like. In general, salicylic esters of alkylated phenols are the preferred compounds for this purpose. Most of the above listed compounds also act as plasticizers. Suitable antiacids include alkyl tin compounds such as dibutyl tin diacetate, dibutyl tin disalicylate, tributyl tin acetate, tetraphenyl tin, epoxy compounds such as styrene oxide, epoxy compounds of oleic acid esters, naphthyl ethylene oxide, and the like.

Dichlorobutadiene polymers and copolymers stabilized in accordance with this invention are characterized by a high degree of resistance to light and oxidative deterioration, rendering them highly suitable for any ordinary commercial applications. Particularly when dichlorobutadiene resins are worked up into forms presenting a large ratio of surface area to volume, as in oriented-crystalline filaments, foils, etc., and still more particularly where these oriented products are destined for applications subject to exposure, as in outdoor furniture upholstery, transportation upholstery, packaging films and the like, the enhanced light- and oxidation-resistance imparted by the practice of this invention is of distinct advantage.

With the foregoing general discussion in mind, there are given herewith detailed examples of the practice of this invention. All parts given are by weight.

PREPARATION OF DICHLOROBUTADIENE RESIN

| | Parts |
|---|---|
| Dichlorobutadiene | 100 |
| Water (distilled) | 400 |
| Potassium persulfate | 1.0 |
| Disodium phosphate | 0.5 |
| Sodium salt of diamyl sulfosuccinate | .27 |
| Amyl mercaptan | 1.67 |

The above ingredients were agitated in a sealed autoclave at a temperature of 27° C. for 18 hours. The water was preliminarily deaerated by boiling, followed by cooling while bubbling nitrogen therethrough, and an atmosphere of nitrogen was maintained in the autoclave throughout the reaction. The resultant latex was coagulated by addition of methanol, and the precipitate was separated by filtration and thoroughly washed on the filter with additional methanol. The resultant granular resin was thermoplastic and extrudable, and exhibited crystalline properties similar to nylon and vinylidene chloride resins. This resin was used as the standard base resin for the stabilization tests to follow.

EXAMPLE I

A

Base dichlorobutadiene resin _____ 1 gram
Acetone _____ .5 ml.

B

Mercaptol stabilizer (per Table I) _____ .01, .02 or .03 grams (per Table I)
Acetone _____ q. s. to dissolve A series of stabilized compositions were made up in accordance with the foregoing recipe, using each of the mercaptols in each of the proportions listed in Table I. In each case, the selected mercaptol was dissolved in a quantity of acetone sufficient to effect the solution thereof, yielding a solution to be designated "B." The dichlorobutadiene resin and acetone listed at "A" were slurried together, solution "B" added thereon, and the entire suspension dried with stirring to yield a resin powder having the selected mercaptol evenly dispersed therein.

A 0.5 gram sample of the dried powdered resin was then inserted between Cellophane sheets and the assembly pressed between flat platens maintained at 180° C. under a total load of 2500 pounds. The assembly was cooled in the press and then removed, yielding a thin transparent plaque usually approximately 3000 sq. mm. in area.

Strips cut from this plaque were then exposed under the conditions set forth in the A. S. T. M. test D-620-45T, using a General Electric Company S-1 sunlamp bulb as the light source. Samples were removed after exposure of 1, 2, 3 and 20 hours, and rated as to color on a subjective scale in which a yellow brown was assigned the number 10, and colors evenly grading up from that of the unexposed resin to that of the yellow brown were assigned the numbers 0, 1, 2, 3 . . . 9. The ratings given the various exposed samples after various times of exposure are set out in Table I in the columns under "Color."

Likewise, those samples removed at the end of 20 hours were examined and were variously rated as "brittle" if they cracked upon repeated flexure; or "cracked" if they merely developed surface hair lines upon flexure. These ratings, together with supplementary observations are likewise included in Table I, under the heading "Physical properties."

From a comparison of the blank (the first item in the table) it will readily be seen that a very marked increase in resistance to discoloration is obtained with the remaining items containing mercaptols in accordance with this invention. Likewise, it will be noted that the region of diminishing returns is attained by the addition of more than 2% of mercaptol, note that the items containing 3% of mercaptol exhibit little if any improved stability over comparable items containing only 2% of mercaptol.

*Table I*

| Stabilizer | Per cent Stabilizer | Discoloration After— | | | | Physical Properties and Remarks after 20 Hrs. |
|---|---|---|---|---|---|---|
| | | 1 hr. | 2 hr. | 3 hr. | 20 hr. | |
| Blank | 0 | 1 | 2 | 4 | 10 | very brittle. |
| Acetone Dicetyl Mercaptol | 1 | 1 | 2 | 4 | 10 | slightly brittle. |
| | 2 | 1 | 2 | 4 | 10 | |
| | 3 | 1 | 2 | 4 | 10 | |
| Mesityl Oxide-di-n-octyl mercaptol | 1 | 3 | 4 | 5 | 10 | Brittle. |
| | 2 | 2 | 3 | 4 | 10 | |
| | 3 | 1 | 2 | 3 | 10 | |

Table I—Continued

| Stabilizer | Per cent Stabilizer | Discoloration After— | | | | Physical Properties and Remarks after 20 Hrs. |
|---|---|---|---|---|---|---|
| | | 1 hr. | 2 hr. | 3 hr. | 20 hr. | |
| Acetonyl acetone tetracetyl mercaptol | 1<br>2<br>3 | 1<br>0<br>0 | 2<br>1<br>1 | 3<br>2<br>2 | 5<br>5<br>5 | very slightly brittle. |
| Benzal thio-p-cresol | 1<br>2<br>3 | 0<br>0<br>0 | 1<br>1<br>1 | 2<br>2<br>2 | 4<br>4<br>4 | |
| Benzaldehyde-di-thio-β-naphthol mercaptal | 1<br>2<br>3 | 2<br>2<br>2 | 3<br>3<br>3 | 4<br>4<br>4 | 10<br>10<br>10 | Brittle. |
| Glyoxal tetracetyl mercaptal | 1<br>2<br>3 | 1<br>1<br>1 | 1<br>1<br>1 | 2<br>2<br>2 | 6<br>6<br>6 | very slightly brittle. |
| Acetyl acetone tetracetyl mercaptol | 3 | 0 | 0 | 0 | 2 | |
| Dibenzal Acetone Dicetyl mercaptol | 1<br>2<br>3 | 0<br>0<br>0 | 1<br>1<br>1 | 1<br>1<br>1 | 7<br>7<br>7 | slight surface checking. |
| Benzal Acetone Dicetyl mercaptol | 1<br>2<br>3 | 0<br>0<br>0 | 0<br>0<br>0 | 0<br>0<br>0 | 6<br>6<br>6 | slightly brittle. |
| Chloral di-dodecyl mercaptol | 1<br>2<br>3 | 0<br>0<br>0 | 0<br>0<br>0 | 0<br>0<br>0 | 8<br>8<br>8 | surface cracking. |
| Dicinnamal Acetone Dicetyl Mercaptol | 1<br>2<br>3 | 0<br>1<br>1 | 1<br>2<br>2 | 2<br>3<br>3 | 6<br>6<br>6 | |
| Dibenzal Acetone Dithio-β naphthol mercaptol | 1<br>2 | 1<br>1 | 1<br>2 | 2<br>2 | 10<br>10 | slightly brittle. |
| 2,3-Dimethoxy Benzaldehyde di-thio-β-naphthol mercaptal | 1<br>2<br>3 | 0<br>0<br>0 | 1<br>1<br>1 | 2<br>2<br>2 | 9<br>9<br>9 | |
| Benzal thio-p-cresol | 3 | 0 | 0 | 0 | 2 | slight surface checking. |
| Glyoxal tetracetyl mercaptal | 3 | 0 | 0 | 0 | 2 | Do. |
| Lauraldehyde thio-β-naphthol Mercaptol | 3 | 0 | 0 | 0 | 6 | slightly brittle. |

EXAMPLE II

*Use of mercaptols in combination with light-screening agents and antiacids*

A

Base dichlorobutadiene resin _____ grams__ 1.0
Acetone _____ c. c__ 5.0

B

Mercaptol (as set out in Table II) __grams__ .01
Light-screening agent (as set out in Table II) _____ grams__ .01
Antiacid (as set out in Table II) _____do_____ .01
Acetone_____ q. s. to dissolve A series of test compounds was made up in accordance with the foregoing recipe, using the various combinations of mercaptol, light-screening agent and antiacid set forth in Table II. In each case, the selected mercaptol, light-screening compound and antiacid were dissolved together in a small amount of acetone, yielding a solution "B." The ingredients listed at "A" were then slurried together, solution "B" added thereto, and the combined materials dried with stirring to yield an even mixture of the resins and the several stabilizing materials.

A plaque was pressed out from each mixture, subjected to ultraviolet exposure, and rated as described in Example I, the results being set forth in Table II. In this table, the abbreviations "Br." and "Cr." denote "brittle" and "cracked" respectively. It will be noted that all of the mixtures of this example gave enhanced results over the mixtures of Example I. Also, for further comparison, samples stabilized with the various light-screening agents and antiacids alone gave results inferior to those of Example I, and, a fortiori, to the results of the present example.

Table II

| Mercaptol (a1) | Light-screening agent | Antiacid | Color After— | | | Physical Properties and Remarks |
|---|---|---|---|---|---|---|
| | | | 2 hrs. | 3 hrs. | 20 hrs. | |
| Acetyl acetone tetracetyl mercaptol. | p-Benzoyl Phenylsalicylate | Dibenzal acetone | 0 | 0 | 5 | |
| | | Dibutyl tin disalicylate | 0 | 0 | 6 | |
| | | Triphenyl carbinol | 0 | 0 | 5 | |
| | Dibutyl tin disalicylate | Dibenzal acetone | 0 | 0 | 4 | Br. |
| | | ___do___ | 0 | 0 | 3 | |
| | | Tributyl tin acetate | 0 | 0 | 3 | |
| | | Triphenyl carbinol | 0 | 0 | 5 | |
| | Bisphenol A-disalicylate | Dibenzal acetone | 0 | 1 | 3 | |
| | | Dibutyl tin disalicylate | 0 | 0 | 2 | Cr. |
| | | Tributyl tin acetate | 0 | 0 | 2 | |
| | | Triphenyl carbinol | 0 | 0 | 3 | |
| | T-butyl catecholyl salicylate | Dibenzal acetone | 0 | 0 | 2 | |
| | | di (2, 6-di-t-butyl-4-methyl phenol) sulfide | 0 | 0 | 1 | |
| | | Dibutyl tin disalicylate | 0 | 0 | 1 | Cr. |
| | | Tributyl tin acetate | 0 | 0 | 1 | |
| | | Triphenyl carbinol | 0 | 0 | 1 | |

Table II—Continued

| Mercaptol (a1) | Light-screening agent | Antiacid | Color After— 2 hrs. | Color After— 3 hrs. | Color After— 20 hrs. | Physical Properties and Remarks |
|---|---|---|---|---|---|---|
| Benzal thio-p-cresol | 2,6-di-t-butyl-4-methyl phenyl salicylate. | Tributyl tin acetate | 0 | 0 | 1 | Sl. Cr. |
| | | Dibutyl tin diacetate | 0 | 0 | 2 | |
| | | Styrene oxide | 0 | 0 | 3 | Cr. |
| | 2,6-di-t-butyl-4-methyl phenol | Tributyl tin acetate | 0 | 0 | 1 | |
| | | Dibutyl tin diacetate | 0 | 0 | 2 | Cr. |
| | | Styrene oxide | 0 | 1 | 1 | |
| | p-nonyl phenyl salicylate | Tributyl tin acetate | 0 | 0 | 1 | |
| | | Styrene oxide | 0 | 0 | 2 | Cr. |
| | | Tetraphenyl tin | 0 | 0 | 2 | Br. |
| | p-ethyl phenyl salicylate | Dibutyl tin disalicylate | 0 | 0 | 1 | Cr. |
| | 2-chloro-5-methylbenzophenone | Tributyl tin acetate | 0 | 0 | 2 | Br. |
| | 2,6-di-t-butyl-4-methyl phenyl salicylate. | Dibutyl tin diacetate | 0 | 0 | 5 | |
| | | Tributyl tin diacetate | 0 | 0 | 4 | |
| | | Triphenyl carbinol | 0 | 0 | 4 | |
| | p-Benzoyl phenyl salicylate | Dibutyl tin disalicylate | 0 | 0 | 6 | |
| | | Tributyl tin acetate | 0 | 0 | 6 | |
| | | Triphenyl carbinol | 0 | 1 | 6 | |
| | Dibutyl tin disalicylate | Dibenzal acetone | 0 | 0 | 4 | Br. |
| | | ...do | 0 | 0 | 5 | |
| | | Tributyl tin acetate | 0 | 0 | 5 | |
| | | Triphenyl carbinol | 0 | 0 | 6 | |
| | Bisphenol-α-disalicylate | Dibenzal acetone | 0 | 0 | 3 | |
| | | Dibutyl tin disalicylate | 0 | 0 | 3 | |
| | | Tributyl tin acetate | 0 | 0 | 3 | |
| | | Triphenyl carbinol | 0 | 0 | 3 | |
| | T-butyl catecholyl salicylate | Dibenzal acetone | 0 | 0 | 3 | |
| | | Dibutyl tin disalicylate | 0 | 0 | 2 | Cr. |
| | | Tributyl tin acetate | 0 | 0 | 3 | |
| | | Triphenyl carbinol | 0 | 0 | 3 | |
| Glyoxal Tetracetyl Mercaptal. | 2,6-di-t-butyl-4-methyl phenyl salicylate. | Dibutyl tin diacetate | 0 | 0 | 2 | |
| | | Tributyl tin acetate | 0 | 0 | 4 | |
| | | Triphenyl carbinol | 0 | 0 | 4 | |
| | p-Benzoyl phenyl salicylate | Dibenzal acetone | 0 | 0 | 5 | Br. |
| | | Dibutyl tin disalicylate | 0 | 0 | 6 | |
| | | Tributyl tin acetate | 0 | 0 | 5 | |
| | | Triphenyl carbinol | 1 | 1 | 6 | |
| | 2,6-di-t-butyl-4-methyl phenol | Dibenzal acetone | 0 | 0 | 5 | |
| | | Dibutyl tin disalicylate | 0 | 0 | 6 | |
| | | Tributyl tin acetate | 0 | 0 | 6 | |
| | | Triphenyl carbinol | 0 | 0 | 5 | |
| | Dibutyl tin disalicylate | Dibenzal acetone | 0 | 0 | 5 | |
| | | Tributyl tin acetate | 0 | 0 | 5 | |
| | | Triphenyl carbinol | 0 | 0 | 5 | Br. |
| | Bisphenol A disalicylate | Dibenzal acetone | 0 | 1 | 3 | |
| | | Dibutyl tin disalicylate | 0 | 0 | 3 | |
| | | Tributyl tin acetate | 0 | 0 | 3 | |
| | | Triphenyl carbinol | 0 | 0 | 3 | |
| | t-Butyl catecholyl salicylate | Dibenzal acetone | 0 | 0 | 3 | |
| | | Dibutyl tin disalicylate | 0 | 0 | 1 | Cr. |
| | | Tributyl tin acetate | 0 | 0 | 2 | |
| | | Triphenyl carbinol | 0 | 0 | 2 | |
| Chloral Didodecyl Mercaptal. | 2,6-di-t-butyl-4-methyl phenyl salicylate. | Dibutyl tin diacetate | 0 | 0 | 3 | |
| | | Tributyl tin acetate | 0 | 0 | 3 | |
| | | Triphenyl carbinol | 0 | 0 | 4 | |
| | p-Benzoyl phenyl salicylate | Dibenzal acetone | 0 | 0 | 6 | |
| | | Dibutyl tin disalicylate | 0 | 0 | 6 | |
| | | Tributyl tin acetate | 0 | 0 | 6 | |
| | | Triphenyl carbinol | 0 | 0 | 6 | |
| | p-nonyl phenyl salicylate | Dibenzal acetone | 0 | 0 | 5 | |
| | | Dibutyl tin disalicylate | 0 | 0 | 5 | Br. |
| | | Tributyl tin acetate | 0 | 0 | 6 | |
| | | Triphenyl carbinol | 0 | 0 | 5 | |
| | Bisphenol A disalicylate | Dibenzal acetone | 0 | 0 | 3 | |
| | | Dibutyl tin disalicylate | 0 | 0 | 3 | |
| | | Tributyl tin acetate | 0 | 0 | 3 | |
| | | Triphenyl carbinol | 0 | 0 | 4 | |
| | Dibutyl tin disalicylate | Dibenzal acetone | 0 | 0 | 3 | |
| | | Tributyl tin acetate | 0 | 0 | 4 | |
| | | Triphenyl carbinol | 0 | 0 | 4 | |
| | t-Butyl catecholyl salicylate | Dibenzal acetone | 0 | 0 | 3 | |
| | | Dibutyl tin disalicylate | 0 | 0 | 2 | Cr. |
| | | Tributyl tin acetate | 0 | 0 | 3 | |
| | | Triphenyl carbinol | 0 | 0 | 3 | |
| Acetone Dicetyl Mercaptol. | p-ethyl phenyl salicylate | Dibutyl tin diacetate | 0 | 0 | 1 | Cr. |
| | | Triphenyl carbinol | 0 | 0 | 2 | Br. |
| | p-Benzoyl phenyl salicylate | Dibenzal acetone | 0 | 1 | 6 | |
| | | Dibutyl tin disalicylate | 0 | 0 | 6 | |
| | | Tributyl tin acetate | 0 | 0 | 6 | |
| | | Triphenyl carbinol | 0 | 0 | 6 | Br. |
| | 2,6-di-t-butyl-4-methyl phenyl salicylate. | Dibenzal acetone | 0 | 0 | 4 | |
| | | Dibutyl tin disalicylate | 0 | 0 | 5 | |
| | | Tributyl tin acetate | 0 | 0 | 5 | |
| | | Triphenyl carbinol | 0 | 0 | 5 | |

Table II—Continued

| Mercaptol (a1) | Light-screening agent | Antiacid | Color After 2 hrs. | 3 hrs. | 20 hrs. | Physical Properties and Remarks |
|---|---|---|---|---|---|---|
| | Dibutyl tin disalicylate | Dibenzal acetone | 0 | 0 | 2 | Cr. |
| | | Tributyl tin acetate | 0 | 0 | 4 | Br. |
| | | Triphenyl carbinol | 0 | 0 | 4 | |
| | Bisphenal A disalicylate | 2-6-di-t-butyl-4-methyl phenal | 0 | 0 | 3 | |
| | | Dibutyl tin disalicylate | 0 | 0 | 2 | |
| | | Tributyl tin acetate | 0 | 0 | 2 | Cr. |
| | | Triphenyl carbinol | 0 | 0 | 2 | |
| | t-Butyl catecholyl salicylate | Dibenzal acetone | 0 | 0 | 3 | |
| | | Dibutyl tin disalicylate | 0 | 0 | 2 | |

EXAMPLE III

| | Parts |
|---|---|
| Base dichlorobutadiene resin | 100 |
| Acetone dicetyl mercaptol | 1 |
| Dibenzal actone | 1 |
| Dibutyl tin diacetate | 1 |
| Dioctyl phthalate | 10 |

The foregoing recipe was selected, from amongst the combination set out in Table II, as giving excellent all-around performance. The listed ingredients were ball-milled together to yield an even dispersal of all components, and then extruded at 185° C. through a .02" die into a water quenching bath maintained at 15° C. The quenched filament was then immediately stretched to 400% of its original length by means of differential rollers, yielding an oriented-crystalline monofilament having a diameter of .008" and a tensile strength of 38,000 pounds per in.² The resultant monofilament was woven into a square weave upholstery fabric which gave excellent performance as a convertible coupé automobile seat cushion covering, under severe conditions of exposure to sunlight and weather.

In view of the foregoing general discussion and detailed specific examples, it will be seen that this invention provides a novel and highly effective means for the stabilization of dichlorobutadiene resins against deterioration by light and oxygen. This effective protection is of particular advantage in oriented crystalline monofilaments and films made from such resins, since the conditions of exposure thereof are quite severe. The stabilizers may be synthesized from readily available aldehydes, ketones and mercaptans.

What is claimed is:

1. A resinous composition resistant to deterioration by light and oxidation, comprising a resin selected from the group consisting of homopolymers of 2,3-dichlorobutadiene-1,3 and copolymers thereof with not more than 75%, based on the weight of such copolymers, of other unsaturated compounds copolymerizable therewith, together with at least 0.5%, based on the weight of resin, of a compound selected from the group consisting of mercaptols and mercaptals having the formula

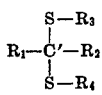

wherein $R_1$ and $R_2$, each independently of the other, represents a hydrogen atom or an aliphatic, araliphatic or aromatic radical attached through one of its carbon atoms to the central carbon atom $C'$ of the formula, and $R_3$ and $R_4$, each independently of the other, represents an aliphatic, araliphatic or aromatic radical attached through one of its carbon atoms to the adjacent sulfur atom of the formula.

2. An oriented crystalline filament comprising a homopolymer of 2,3-dichlorobutadiene-1,3, together with at least 0.5% of a compound selected from the group consisting of mercaptols and mercaptals having the formula

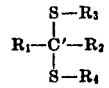

wherein $R_1$ and $R_2$, each independently of the other, represents a hydrogen atom or an aliphatic, araliphatic or aromatic radical attached through one of its carbon atoms to the central carbon atom $C'$ of the formula, and $R_3$ and $R_4$, each independently of the other, represents an aliphatic, araliphatic or aromatic radical attached through one of its carbon atoms to the adjacent sulfur atom of the formula.

3. A resinous composition resistant to deterioration by light and oxidation, comprising a resin selected from the group consisting of polymers of 2,3-dichlorobutadiene-1,3 and copolymers thereof with not more than 75%, based on the weight of such copolymers, of other unsaturated compounds copolymerizable therewith, together with (A) at least 0.5%, based on the weight of resin, of a compound selected from the group consisting of mercaptols and mercaptals having the formula

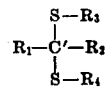

wherein $R_1$ and $R_2$, each independently of the other, represents a hydrogen atom or an aliphatic, araliphatic or aromatic radical attached through one of its carbon atoms to the central carbon atom $C'$ of the formula, $R_3$ and $R_4$, each independently of the other, represents an aliphatic, araliphatic or aromatic radical attached through one of its carbon atoms to the adjacent sulfur atom of the formula; (B) a light-screening agent and (C) an antiacid.

4. A resinous composition resistant to deterioration by light and oxidation, comprising a resin selected from the group consisting of polymers of 2,3-dichlorobutadiene-1,3 and copolymers thereof with not more than 75%, based on the weight of such copolymers, of other unsaturated compounds copolymerizable therewith, together with (A) at least 0.5%, based on the weight of resin, of a compound selected from the group consisting of mercaptols and mercaptals having the formula

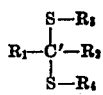

wherein $R_1$ and $R_2$, each independently of the other, represents a hydrogen atom or an aliphatic, araliphatic or aromatic radical attached through one of its carbon atoms to the central carbon atom C' of the formula, and $R_3$ and $R_4$, each independently of the other, represents an aliphatic, araliphatic or aromatic radical attached through one of its carbon atoms to the adjacent sulfur atom of the formula; and (B) a salicylic ester of an alkylated phenol.

5. An oriented-crystalline filament comprising a resinous polymer of 2,3-dichlorobutadiene-1,3, together with, based on the weight of polymer, at least 0.5% of acetone dicetyl mercaptol.

6. An oriented-crystalline filament comprising a resinous polymer of 2,3-dichlorobutadiene-1,3, together with, based on the weight of polymer, at least 0.5% of acetyl acetone dicetyl mercaptol.

7. An oriented-crystalline filament comprising a resinous polymer of 2,3-dichlorobutadiene-1,3, together with at least 0.5% of each of the compounds acetyl acetone dicetyl mercaptol, para-tertiary-butyl catechol salicylate and tributyl tin acetate.

8. Process of stabilizing a resin selected from the group consisting of polymers of 2,3-dichlorobutadiene-1,3 and copolymers thereof with not more than 75%, based on the weight of copolymer, of other unsaturated compounds copolymerizable therewith, which comprises adding to the selected resin at least 0.5%, based on the weight of resin, of a compound selected from the group consisting of mercaptols and mercaptals having the formula

wherein $R_1$ and $R_2$, each independently of the other, represents a hydrogen atom or an aliphatic, araliphatic or aromatic radical attached through one of its carbon atoms to the central carbon atom C' of the formula, and $R_3$ and $R_4$, each independently of the other, represents an aliphatic, araliphatic or aromatic radical attached through one of its carbon atoms to the adjacent sulfur atom of the formula.

9. Process of stabilizing a resinous polymer of 2,3-dichlorobutadiene-1,3, which comprises adding thereto at least 0.5%, based on the weight of resin, of a compound selected from the group consisting of mercaptols and mercaptals having the formula

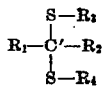

wherein $R_1$ and $R_2$, each independently of the other, represents a hydrogen atom or an aliphatic, araliphatic or aromatic radical attached through one of its carbon atoms to the central carbon atom C' of the formula, and $R_3$ and $R_4$, each independently of the other, represents an aliphatic, araliphatic or aromatic radical attached through one of its carbon atoms to the adjacent sulfur atom of the formula.

10. Process of stabilizing a resin selected from the group consisting of polymers of 2,3-dichlorobutadiene-1,3 and copolymers thereof with not more than 75%, based on the weight of copolymer, of other unsaturated compounds copolymerizable therewith, which comprises adding to the selected resin at least 0.5%, based on the weight of resin, of each of (A) a compound selected from the group of mercaptols and mercaptals having the formula

wherein $R_1$ and $R_2$, each independently of the other, represents a hydrogen atom or an aliphatic, araliphatic or aromatic radical attached through one of its carbon atoms to the central carbon atom C' of the formula, and $R_3$ and $R_4$, each independently of the other, represents an aliphatic, araliphatic or aromatic radical attached through one of its carbon atoms to the adjacent sulfur atom of the formula, (B) a light-screening agent and (C) an antiacid.

11. Process of stabilizing a resin selected from the group consisting of polymers of 2,3-dichlorobutadiene-1,3 and copolymers thereof with not more than 75%, based on the weight of copolymer, of other unsaturated compounds copolymerizable therewith, which comprises adding to the selected resin at least 0.5%, based on the weight of resin, of each of (A) a compound selected from the group of mercaptols and mercaptals having the formula

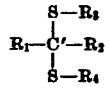

wherein $R_1$ and $R_2$, each independently of the other, represents a hydrogen atom or an aliphatic, araliphatic or aromatic radical attached through one of its carbon atoms to the central carbon atom C' of the formula, and $R_3$ and $R_4$, each independently of the other, represents an aliphatic, araliphatic or aromatic radical attached through one of its carbon atoms to the adjacent sulfur atom of the formula, and (B) a salicyclic ester of an alkylated phenol.

12. Process of stabilizing a resinous polymer of 2,3-dichlorobutadiene-1,3, which comprises adding thereto at least 0.5% acetone dicetyl mercaptol.

13. Process of stabilizing a resinous polymer of 2,3-dichlorobutadiene-1,3 which comprises adding thereto at least 0.5% acetyl acetone tetracetyl mercaptol.

14. Process of stabilizing a resinous polymer of 2,3-dichlorobutadiene-1,3 which comprises adding thereto at least 0.5% of each of the compounds (A) acetyl acetone tetracetyl mercaptol, (B) para-tertiary butyl catechol salicylate and (C) tributyl tin acetate.

GEORGE P. ROWLAND, Jr.
ROBERT J. REID.

Certificate of Correction

Patent No. 2,445,739.  July 20, 1948.

GEORGE P. ROWLAND, Jr., ET AL.

It is hereby certified that errors appear in the printed specification of the above numbered patent requiring correction as follows:

Column 6, line 16, for the word "thereon" read *thereto*; column 7, Table 1, 8th item under the heading "Stabilizer", for "Chloral di-dodecyl mercaptol" read *Chloral di-dodecyl mercaptal*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*